(12) United States Patent
Gonring et al.

(10) Patent No.: US 11,970,251 B2
(45) Date of Patent: *Apr. 30, 2024

(54) LANYARD SYSTEM AND METHOD FOR A MARINE VESSEL

(71) Applicants: Brunswick Corporation, Mettawa, IL (US); FELL Marine Inc., Delray Beach, FL (US)

(72) Inventors: Steven J. Gonring, Slinger, WI (US); Walter B. Ross, Fond du Lac, WI (US); Fredrik Eriksen, Viken (NO); Christian Frost Røine, Viken (NO)

(73) Assignee: Brunswick Corporation, Mettawa, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/184,245

(22) Filed: Mar. 15, 2023

(65) Prior Publication Data

US 2023/0227132 A1    Jul. 20, 2023

Related U.S. Application Data

(63) Continuation of application No. 16/786,207, filed on Feb. 10, 2020, now Pat. No. 11,618,538.

(Continued)

(51) Int. Cl.
*B63B 79/40* (2020.01)
*B63B 21/24* (2006.01)
(Continued)

(52) U.S. Cl.
CPC .............. *B63B 79/40* (2020.01); *B63B 21/24* (2013.01); *B63B 45/02* (2013.01); *B63B 45/08* (2013.01);
(Continued)

(58) Field of Classification Search
CPC ......... B63B 79/40; B63B 21/24; B63B 45/02; B63B 45/08; B63C 9/0005; B63H 21/21;
(Continued)

(56) References Cited

U.S. PATENT DOCUMENTS

| 4,250,358 A | 2/1981 | Gilbertson |
| 4,809,199 A | 2/1989 | Burgess et al. |

(Continued)

FOREIGN PATENT DOCUMENTS

| EP | 3608215 A1 | 2/2020 |
| GB | 2523842 A | 9/2015 |

OTHER PUBLICATIONS

EP Application No. 20157053.8, Search Report, dated Jul. 13, 2020.

*Primary Examiner* — Stephen P Avila
(74) *Attorney, Agent, or Firm* — Andrus Intellectual Property Law, LLP

(57) ABSTRACT

A method and system for controlling a marine vessel is configured to operate a lanyard system to detect at least one fob worn by an individual present on the marine vessel and determine that a missing fob of the at least one fob is no longer detected, wherein the missing fob is either an operator fob or a passenger fob. A man overboard event is generated based on the missing fob, wherein the man overboard event is an operator overboard event if the missing fob includes the operator fob or a passenger overboard event if the missing fob is the passenger fob. One or more search assistance functions are automatically activated based on the man overboard event, wherein the search assistance functions activated depend on whether the man overboard event is the operator overboard event or the passenger overboard event.

24 Claims, 5 Drawing Sheets

Related U.S. Application Data

(60) Provisional application No. 62/804,976, filed on Feb. 13, 2019.

(51) Int. Cl.
| | |
|---|---|
| *B63B 45/02* | (2006.01) |
| *B63B 45/08* | (2006.01) |
| *B63C 9/00* | (2006.01) |
| *B63H 21/21* | (2006.01) |
| *G01S 1/70* | (2006.01) |

(52) U.S. Cl.
CPC ............ *B63C 9/0005* (2013.01); *B63H 21/21* (2013.01); *B63H 2021/216* (2013.01); *G01S 1/7038* (2019.08); *G01S 2201/08* (2019.08)

(58) Field of Classification Search
CPC ............. B63H 2021/216; G01S 1/7038; G01S 2201/08
See application file for complete search history.

(56) References Cited

U.S. PATENT DOCUMENTS

| | | |
|---|---|---|
| 6,150,928 A | 11/2000 | Murray |
| 6,799,546 B1 | 10/2004 | Gonring et al. |
| 7,081,028 B1 | 7/2006 | Crane |
| 7,176,832 B2 | 2/2007 | Bruno |
| 7,355,518 B1 | 4/2008 | Staerzl |
| 9,284,032 B1 | 3/2016 | Snyder et al. |
| 9,695,764 B1 | 7/2017 | Christiansen et al. |
| 11,618,538 B2 * | 4/2023 | Gonring ................ B63B 21/24 701/21 |
| 2003/0089291 A1 | 5/2003 | Kanno |
| 2003/0120831 A1 | 6/2003 | Dubil et al. |
| 2009/0219160 A1 | 9/2009 | Shervey et al. |
| 2010/0049386 A1 | 2/2010 | Bamba |
| 2016/0044699 A1 | 2/2016 | Vincent |
| 2017/0221657 A1 | 8/2017 | Barker |
| 2019/0047512 A1 | 2/2019 | Gersabeck et al. |
| 2019/0308614 A1 | 12/2019 | Lavoie et al. |

\* cited by examiner

LANYARD SYSTEM AND METHOD FOR A MARINE VESSEL

CROSS-REFERENCE TO RELATED APPLICATION

The present application is a continuation of U.S. patent application Ser. No. 16/786,207, filed Feb. 10, 2020, which claims benefit of U.S. Provisional Application No. 62/804,976, filed Feb. 13, 2019, the content of which is incorporated herein in its entirety.

FIELD

The disclosure generally relates to lanyard systems for marine vessels and, more particularly, to wireless lanyard systems that integrate with vessel control systems to automatically activate one or more search assistance functions.

BACKGROUND

The following U.S. patents and applications provide background information and are incorporated herein by reference in entirety.

U.S. Pat. No. 4,250,358 discloses a safety stop switch for a marine engine that includes a control unit housing, and a normally closed, single throw toggle switch mounted on the housing and including a switch arm extending away from the housing to permit operation of the switch between closed and open positions. The switch is electrically connected to the engine to interrupt engine operation when switched to the open position. A hood extends from the periphery of the housing and covers the switch arm when in the closed position, and has a peripheral lip which is spaced from the switch arm a dimension which is less than the thickness of a key which encircles the switch arm. A lanyard is connected to the key and to the boat operator, and upon the exertion of a force on the lanyard, the key pulls the switch arm down into the open position, thereby interrupting operation of the marine engine.

U.S. Pat. No. 4,809,199 discloses a keyless marine access and engine control system. The system is caused to change from a dormant state to an enabled state when a sequence of actuation signals entered through a keypad matches data representing either one of two access sequences stored in the system's memory. When the system is in its enabled state, the system responds only to signals representing a keypad actuation exceeding a first predetermined time interval. These signals are used to crank, choke, and stop a marine vehicle engine. The secondary access sequence can be changed by a person who knows either the primary access sequence or the secondary access sequence, while the primary access sequence can be changed only by a person having knowledge of the present primary access sequence. In order to reprogram either access sequence, a programming button must be actuated for a predetermined time interval exceeding the first time interval. The system can be used with either a single or dual engine installation.

U.S. Pat. No. 6,799,546 discloses a method for starting a marine internal combustion engine that is independent of a continued signal received from a starting switch. If the operator of the marine vessel momentarily depresses a starting switch, a predetermined procedure is followed by a microprocessor which does not require continued involvement of the marine vessel operator. Various parameters are checked during the starting sequence and various actuators are activated to assure a safe and reliable starting procedure.

U.S. Pat. No. 7,081,028 discloses an engine control system for a marine propulsion system that uses a portable control device that is configured to emit first and second signals that are receivable by first and second sensors. The first signal relates to the starting of the engine of the marine propulsion system by the operator. The second signal relates to the presence of the operator, wearing the portable control device, within a prescribed zone surrounding the second sensor near the helm position.

U.S. Pat. No. 7,355,518 discloses a monitoring system that detects the presence or absence of a marine vessel operator within a defined zone near the helm of a marine vessel. The detection is accomplished through the use of a provision of an e-field and the detection of e-field strength by a receiving antenna system. When the operator is in the proper helm position, the e-field strength is diminished by the presence of a portion of the operator's body within the e-field zone.

U.S. Pat. No. 9,284,032 discloses a control system and method for deterring theft of a marine vessel. A security control circuit receives a transponder identification code from a transponder. The engine control circuit has a status that is based on a comparison of a stored identification code with the transponder identification code. The status of the engine control circuit is locked if the stored identification code does not match the transponder identification code and the status of the engine control circuit is unlocked if the stored identification code does match the transponder identification code. The security control circuit determines an arbitrated lock status of the control system based on a conjunctive analysis of the locked and unlocked statuses of a plurality of engine control circuits connected to a network bus, and indicates the arbitrated lock status to an operator of the marine vessel.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In one embodiment, a vessel control system for a marine vessel propelled by at least one propulsion device includes a wireless lanyard system including at least one fob worn by an individual on the marine vessel and a helm transceiver at a helm area of the marine vessel configured to receive radio signals from the at least one fob. A controller is configured to detect, based on communications between each of the at least one fob and the helm transceiver, that each of the at least one fob is present on the marine vessel. A missing fob is detected if at least one of the fobs is no longer detected at the helm transceiver, and then a man overboard event is generated. The vessel control system is configured to automatically activate one or more search assistance functions based on the man overboard event.

One embodiment of a method of controlling a marine vessel includes operating a wireless lanyard system to receive, at a helm transceiver at a helm area of the marine vessel, radio signals from at least one fob worn by an individual on the marine vessel. The presence of each of the at least one fob is detected based on communications between each of the at least one fob and the helm transceiver. A missing fob is identified when at least one fob is no longer detected at the helm transceiver and a man overboard event is then generated. One or more search assistance functions are automatically activated based on the man overboard event.

Various other features, objects, and advantages of the invention will be made apparent from the following description taken together with the drawings.

BRIEF DESCRIPTION OF THE DRAWINGS

The present disclosure is described with reference to the following Figures.

DETAILED DESCRIPTION

Figure 1A:
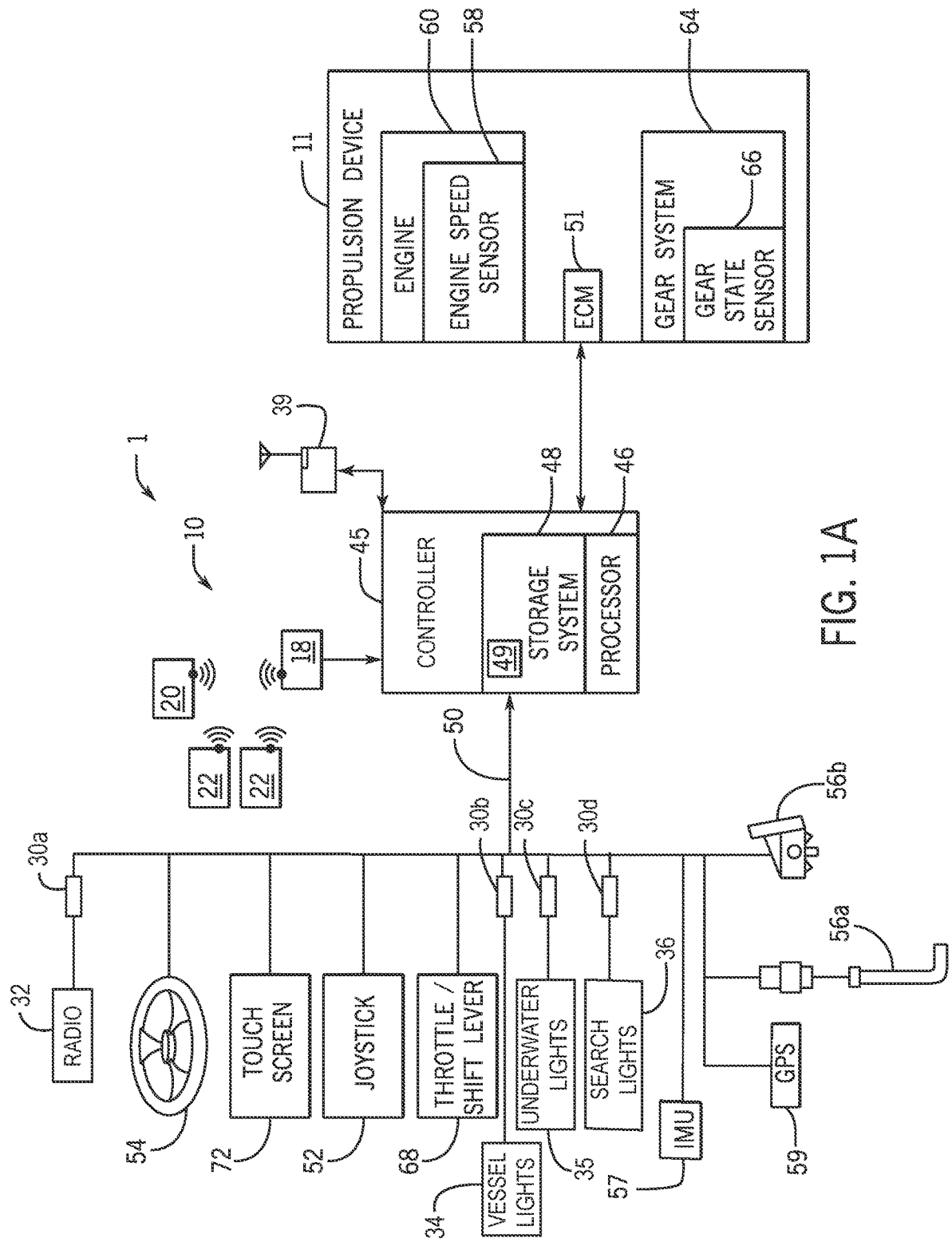
FIGS. 1A and 1B schematically depict embodiments of a lanyard system integrated into a control system on a marine vessel.

Traditional wired lanyard systems have existed for decades which, if utilized properly, stop the engine if the operator leaves the helm area, such as accidentally falls overboard. Corded lanyard systems are well known in the relevant art, one example of which is shown and described at U.S. Pat. No. 4,250,358, which has been incorporated herein. Traditional corded lanyard systems consist of a mechanical switch mounted at the helm and a tether (or cord) which physically connects the user to the switch. If the operator moves too far away from the helm, the switch is pulled and the ignition is shut off. The area that the operator must stay within is determined by the length of the tether cord.

Although very effective and low cost, the corded lanyards are sometimes considered a nuisance and thus are not preferred by many boaters. Accordingly, corded lanyard systems often go unused leaving no operator location safety system in place to stop the propulsion device if the operator were to leave the helm area, such as due to accidentally falling overboard. To address this issue, different wireless solutions have been developed that wirelessly locate the operator within the helm area and turn off the propulsion device if the operator is not located. Certain examples of wireless lanyard systems are shown and described at U.S. Pat. Nos. 7,081,028 and 7,355,518, which are incorporated herein by reference.

Through experimentation and research in the relevant field, the inventor has recognized that improvements are needed for both corded and wireless lanyard systems in order to provide advanced functionality in response to a man overboard event. Namely, in both corded and wireless lanyard systems where a driver or a passenger wearing a fob communicating with the wireless lanyard system falls overboard, a man overboard event is identified and a corresponding event notification generated. For example, when a fob signal emitted by a particular driver or passenger fob is suddenly not detected by a transceiver of the wireless lanyard system, then it may be assumed based on the missing fob signal that the person carrying that fob has fallen overboard. Similarly, in a corded system, a switch position may change or removal of the lanyard from the system may otherwise be detected and associated with a man overboard event.

The inventor has recognized a need for automatic activation of one or more search assistance functions upon detection of a man overboard. The lanyard system communicates with other systems aboard the vessel, such as via a CAN network and digital switching system, to activate devices and systems on the marine vessel that may aid in the rescue of a person who has fallen overboard. For example, as disclosed in various examples herein, the lanyard system may be configured to automatically activate one or more search assistance functions based on the generation of a man overboard event, including automatically turning on one or more searchlights, turning on at least one underwater light, controlling one or more lights on the vessel to generate an SOS pattern, dropping an anchor, reducing a stereo volume or turning off a stereo. Alternatively or additionally, the system may be configured to record information about vessel location and/or condition on or around the time of the man overboard event. For example, the vessel control system may be configured to automatically record GPS location and/or IMU data at the time of the man overboard event. In certain examples, such search assistance functions may be performed in addition to and/or simultaneously with automatically stopping propulsion of the marine vessel, such as by reducing the engine RPM to idle and shifting the gear system to a neutral position where it is not engaged in either a forward gear position or a reverse gear position.

Figure 1B:
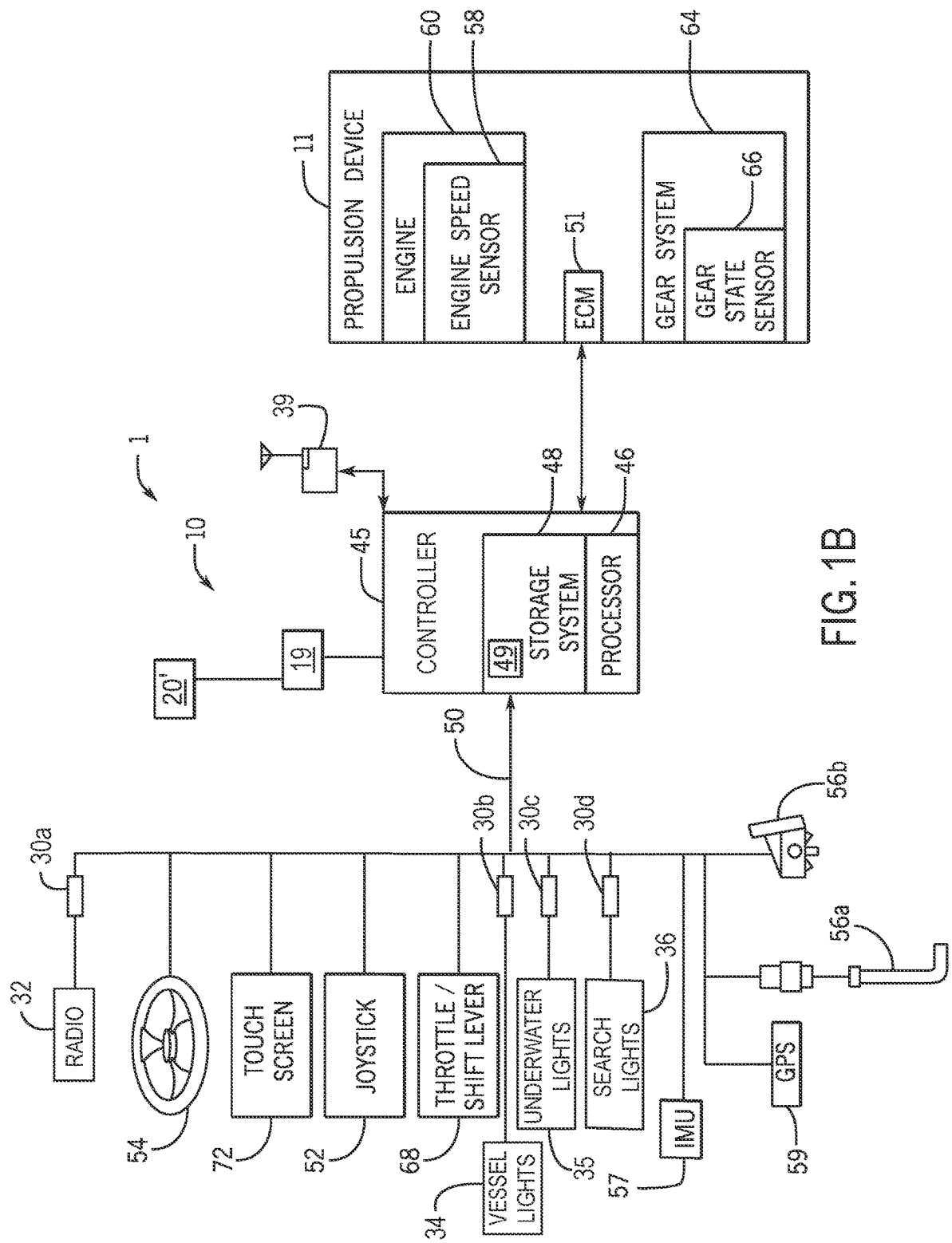

FIGS. 1A and 1B schematically depict embodiments of a control system 1 on a marine vessel. The control system 1 includes a controller 45, such as a command control module (CCM), a helm control module (HCM), or a dedicated control module for providing the wireless lanyard functionality, that is programmable and includes a processor 46 and a storage system 48 comprising memory. The control system 1 includes a lanyard system 10 configured to detect the presence of one or more fobs that wirelessly communicate with a transceiver at a known and fixed location on the marine vessel, such as at the helm.

In the embodiment of FIG. 1A, the lanyard system 10 is a wireless system including a helm transceiver 18 in radio communication with a wireless operator fob 20 worn by an operator of the marine vessel. The lanyard system 10 may also include one or more passenger fobs 22 in radio communication with the helm transceiver 18, where each wireless passenger fob 22 is worn by a passenger on the marine vessel.

In the embodiment of FIG. 1B, the lanyard system 10 is a wired system including a switch 19 located at the helm configured for physical connection with a lanyard operator fob 20' worn by an operator of the marine vessel, such as a tether or band clipped to the operators clothing or life vest or worn on the operator's wrist. The switch 19 is communicatively connected to the controller 45 such that if the lanyard operator fob 21 is disconnected from the switch 19 a signal will be communicated to the controller 45 that will be associated with a man overboard event.

The lanyard system 10 further includes a lanyard control module 49, which is a set of software instructions stored on and executable by controller 45 in order to detect and generate a man overboard event. The control system 1 is configured such that, upon generation of the man overboard event, one or more search assistance functions are automatically activated, various embodiments of which are described herein.

Additionally, the control system 1 may be configured to reduce operation of the one or more propulsion devices 11 on the marine vessel upon receipt of the man overboard event, particularly if the operator fob 20 triggers the man overboard event, so as to stop propelling the marine vessel. For example, system 1 may be configured to reduce the engine RPM of the engine 60 to an idle set point and then automatically shift the gear system 64 to its neutral position. Thereby, the propulsion device can be made immediately available for operation by another passenger, such as to pick up the person who may have fallen overboard. For example, the engine RPM may be reduced at a pre-set reduction rate, which may be the fastest safe rate of reducing engine RPM for a given marine vessel. Thereby, the marine vessel can be safely stopped even if an operator is not at the helm, and the marine vessel can be made immediately available to any individual who takes over at the helm. Such functionality may be associated, in particular, with an operator overboard event where an operator fob 20 is no longer detected. Such embodiment may be effectuated by a control system 1 having a digital throttle shift (DTS) system wherein the throttle and shift control is digitally provided, such as in the arrangement of FIGS. 1A and 1B. In another embodiment where the throttle/shift lever 68 is directly linked to the gear system 64, the system 1 may be configured to turn off the propulsion device 11 after detection of a man overboard event.

The controller 45 executing the lanyard control module 49 software is configured to continuously detect, or identify, whether one or more fobs 20, 22 are present on the marine vessel. For example, fob 20, 22 detection may include determining whether transmissions from each fob 20, 22 are detected at the helm transceiver 18 with sufficient signal strength. If one or more of the fobs 20, 22 is no longer detected at the helm transceiver 18 then a man overboard event is generated by communicating an alert over a vessel network 50 to reach one or more device activation switches or modules. The man overboard event may be communicated via a wired vessel network, such as a CAN network, or via a wireless network, such as a wireless LAN for the vessel. In certain embodiments, the man overboard event communicated on the vessel network 50 may be different depending on the configuration of the missing fob (e.g., whether it is an operator fob 20 or a passenger fob 22).

The control system 1 may include one or more control devices incorporated in the vessel network, such as a digital switching system comprising multiple digital switching nodes 30 to control various devices that effectuate the search assistance functions. For example, the digital switching nodes 30a-30d may be networked digital switch interfaces, each configured to control one or more connected devices in a particular way in response to receipt of a man overboard event. For example, the digital switching nodes 30a-30d may comprise part of a CZone Control and Monitoring system, by Power Products, LLC of Menomonee Falls, WI. Each digital switching node 30a-30d is connected to one or more devices and configured to control those devices based on the man overboard event received via the vessel network 50.

Thereby, various devices may be controlled intelligently based on information provided by the man overboard event in order to activate respective search assistance functions. In various embodiments, the man overboard event may specify a type of man overboard event based on the fobs 20, 22 that are detected or not detected at the helm transceiver 18, such as a passenger overboard event when a passenger fob 22 is no longer detected (i.e., the missing fob is the operator fob 20), an operator overboard event when an operator fob 20 is no longer detected (i.e., the missing fob is a passenger fob 22), and/or a solo operator overboard event when only one operator fob 20 was present and is no longer detected at the helm transceiver 18.

In the depicted example, the digital switching node 30a is connected to a radio, such as for playing music or other entertainment through speakers on the marine vessel. When a man overboard event is generated, the digital switching node 30a may be configured to control a volume of the radio 32 and/or to stop playing or responding to certain inputs on the radio, such as inputs playing music or other entertainment.

Other digital switching nodes 30b-30d are associated with various lights on the marine vessel and each configured to control those lights to provide search assistance functions in response to a man overboard event. Digital switching node 30b is configured to control vessel lights 34, such as lights on the front and back of the marine vessel or beacon lights visible from a distance. For example, the digital switching node 30b may be configured to control the vessel lights 34 in response to certain man overboard events in order to generate an SOS alert, such as to flash the vessel lights 34 in an SOS pattern to signal for help. In one example, the digital switching node 30b may be configured to control the vessel lights 34 to signal SOS in response to receiving an operator overboard event, or receiving a solo operator overboard event or an overboard event where no fobs 20, 22 are detected on the vessel.

Digital switching node 30c is connected to underwater lights 35 and may be configured to illuminate the underwater lights in response to the man overboard event so as to illuminate the water in the area around the marine vessel and allow easier location of the person who has fallen off the marine vessel. In certain embodiments, the digital switching node 30c associated with the underwater lights 35 may be configured to only activate the underwater lights 35 in low light conditions and/or at certain times of day. In other embodiments, the underwater lights 35 may always be activated upon receipt of a man overboard event, or certain types of man overboard events, by the respective digital switching node 30c.

Digital switching node 30d activates one or more searchlights 36 in response to receipt of a man overboard event. Similar to the underwater lights 35, the searchlights 36 are utilized to help locate the person who has fallen overboard. In various embodiments, the system 1 may be configured to illuminate the searchlights 36 in response to certain overboard event types and/or other conditions. For example, the searchlights 36 may be selectively illuminated based on lighting conditions and/or time of day, or may always be illuminated in response to a man overboard event. In certain embodiments (not shown), one digital switching node may control both the underwater lights 35 and the searchlights 36, and/or the single digital switching node may also control the vessel lights 34. In other embodiments, the controller 45 may have a direct wired connection to one or more of the various devices involved in search assistance functions, such as the radio 32, vessel lights 34, underwater lights 35 and/or searchlights 36, and may directly control those devices rather than utilizing the digital switching system 30a-30d and/or the vessel network 50.

In one embodiment, the search assistance functions may include recording and/or storing information about the vessel location and/or condition. For example, the lanyard control module 49 may be configured to, upon detection of a man overboard event, store a GPS location of the marine vessel based on the location provided by the global positioning system (GPS) 59. To provide one example, the lanyard control module 49 may be configured to store the time and GPS location in storage system 48 memory of the controller 45 when at least one of the fobs 20, 22 is not detected. In instances where a warning, or fob missing alert, is first generated and there is a delay before generating the man overboard alert, the time and GPS location may be continuously recorded and may be stored and/or transmitted upon actual generation of the man overboard alert (see FIG. 3 and the discussion below regarding the warning).

In certain embodiments, the lanyard control module 49 may further be configured to record and store other information about the vessel condition, such as information about vessel speed, which may be based on the GPS 59 location and/or based on speed measurements from one or more vessel speed sensors, such as a pitot tube 56a or paddle wheel 56b. Similarly, the recorded vessel condition information may include information from the IMU 57 or other sensor sensing vessel angle, steering angle, etc. Similarly, the recorded vessel condition information may include inputs at one or more of the user input devices, including the steering wheel 54, the throttle/shift lever 68, the joystick 52, and/or the touchscreen 72. The lanyard control module 49 may be configured to, for example, store such vessel condition information in the storage system 48 to create a record of the event and/or so that such information can be transmitted to a remote receiving location, such as part of a call for help. In one embodiment, system 1 may be configured to store a running cache of some or all of the forgoing vessel condition information. When a fob 20, 22 is no longer detected, the system may be configured to save the cached vessel condition information and/or to continue recording vessel condition information for a predetermined period of time so as to make a complete record of the man overboard event.

In certain embodiments, system 1 may include a call for help transceiver 39. For example, the call for help transceiver 39 may be a cellular network device or other communication transceiver operable by the controller 45 to generate a call for help in response to certain man overboard events and/or man overboard events in combination with certain vessel conditions. The call for help transceiver 39 may operate on a cellphone network and be configured to utilize cellular communication to send out a call for help. In other embodiments, the call for help transceiver 39 may be a marine VHF radio that operates on the VHF radio frequency range in order to generate the call for help. In still other embodiments, system 1 may include a distress beacon transmitter, such as a marine emergency beacon, operable to generate the call for help.

In one embodiment, the helm transceiver 18 of the wireless lanyard system 10 may be placed within the helm area 15 of a marine vessel. The helm transceiver 18 receives radio signals from a wireless operator fob 20 and/or from one or more passenger fobs 22. In many embodiments, the helm transceiver may also be configured to transmit radio signals to the fobs 20, 22. The helm transceiver 18 may be permanently mounted to the helm area 15 such as mounted in or behind the dashboard near the steering wheel 54 and/or throttle/shift lever 68. The helm transceiver 18 is connected to a power source, such as to 12 volt DC power provided by a battery associated with the propulsion device 11. The helm transceiver 18 further communicates with one or more controller 45 to indicate whether radio signals are being received from the operator fob 20 and/or passenger fob(s) 22. In certain embodiments, the helm transceiver 18 and fob(s) 20, 22 may communicate to determine an operator distance between the respective fob and the helm transceiver, and in such embodiments, the helm transceiver 18 may further communicate the operator distance to the respective controller 45 for use by the lanyard control module 49.

The wireless operator fob 20 and passenger fob(s) 22 are each an electrical device carried or worn by the operator or passenger, respectively, which transmits radio signals to the helm transceiver 18. The wireless fobs are battery-driven, such as containing a replaceable or rechargeable battery. The helm transceiver 18 and wireless fobs 20, 22 may communicate by any of various wireless protocols. In certain embodiments, the helm transceiver 18 and wireless fobs 20, 22 may be RFID devices. In one embodiment, the wireless fobs 20, 22 may contain a passive or active RFID tag, and the helm transceiver 18 may be an active or passive reader, which operate by any of various wireless standards, including Bluetooth standards or 802.11 WLAN.

Figure 2A:
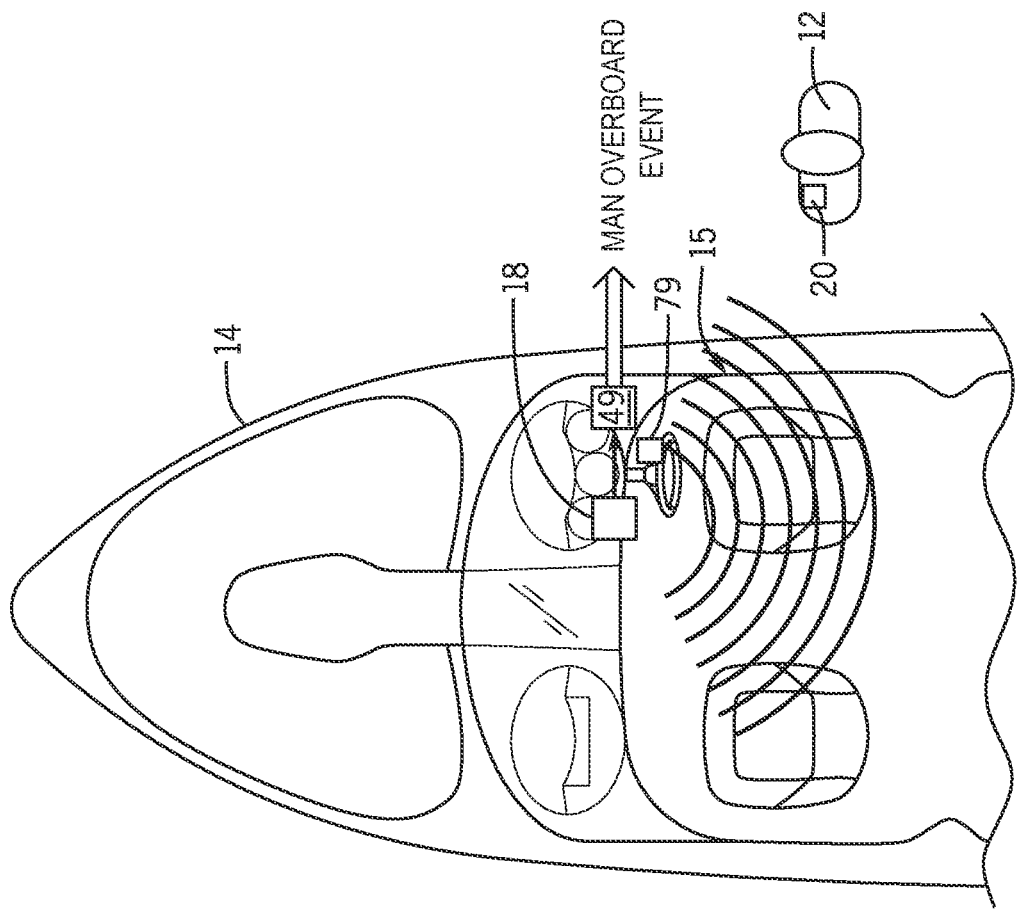
FIGS. 2A-2B exemplify operation of an embodiment of a wireless lanyard system and method.
Figure 2B:
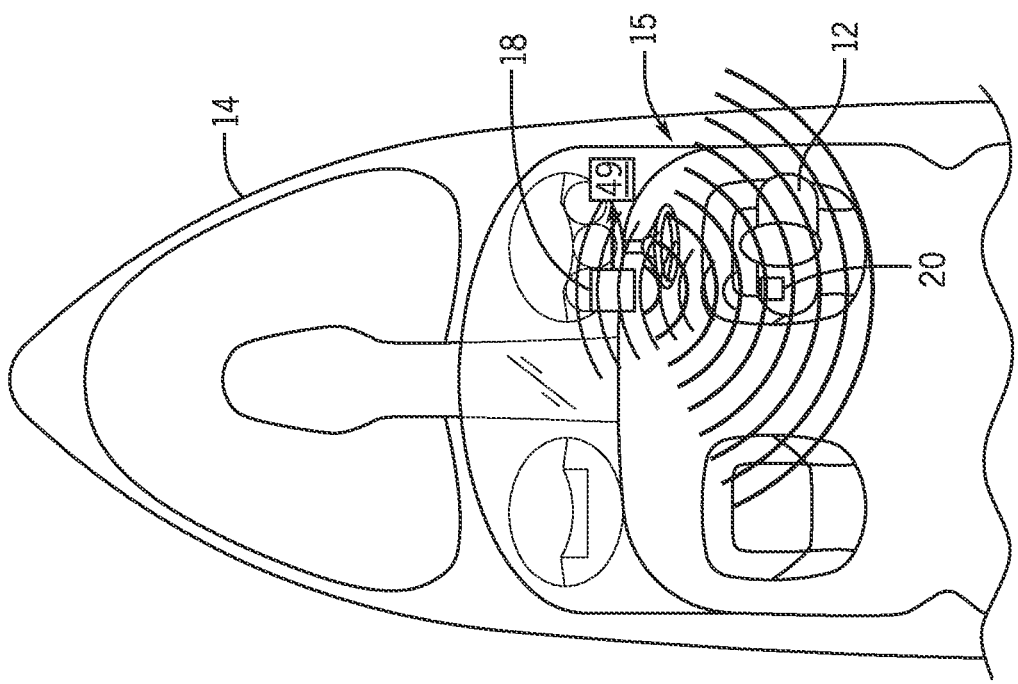

FIGS. 2A and 2B depict operation of one embodiment of the wireless lanyard system 10. The helm transceiver 18 transmits a radio signal to the wireless operator fob 20 worn by the operator 12. The wireless operator fob 20 receives the radio transmission from the helm transceiver 18 and communicates a responsive signal thereto. In one exemplary embodiment, the helm transceiver 18 may begin to "poll" the wireless operator fob 20, such as at a polling rate of once per second. In certain embodiments, the helm transceiver 18 may only generate the inquiry signal to poll the wireless operator fob 20 when the engine 60 is running and/or when certain conditions are met, such as when the engine speed is above a threshold engine speed, the vessel speed is above a threshold vessel speed, and/or when the gear system 64 is shifted out of a neutral position. The wireless operator fob 20 receives the signal and returns a message to the helm transceiver 18 indicating that the signal was received, and thus the operator 12 is detected. Such information is then provided to the lanyard control module 49.

Likewise, the one or more passenger fobs 22 may be polled, which may be polled simultaneously with the operator fob 20 using the same polling signal, or may be polled separately from the operator fob 20. For example, the passenger fobs 22 may be polled at a different signal strength than the operator fob 20. In one example, the signal strength for the operator fob 20 may be lower than that for the passenger fobs 22 because it may be expected that the operator remains closer to the helm area than the passengers. The fobs 20, 22 may be configured to transmit a fob identification as part of their response signal so that the fob signals can be differentiated.

If the helm transceiver 18 does not receive a return signal from the wireless operator fob 20 or the wireless passenger fob 22, it is assumed that the operator or passenger is not present and appropriate action is taken toward generating a man overboard event. In certain embodiments, if a return signal is not detected by the helm transceiver 18, then a warning alert is generated, such as an audio and/or a visual alert. For example, a horn 79 or another auditory warning generation device may be sounded to indicate when no return signal is detected. Alternatively, a visual indicator may be provided, such as via the touchscreen 72 or some other device in the helm area 15 providing a visual warning to the operator or passenger that a fob 20, 22 is not detected. If the warning is not silenced within a predefined warning period and no return signal is detected from the operator fob 20 within the predefined warning period, then a man overboard event is generated.

In other embodiments, no warning may be provided, and a lanyard event may be generated immediately upon determining that a fob 20, 22 is not detected. In still other embodiments, the warning period may be selectively enacted. For example, in certain embodiments described herein, the wireless lanyard system 10 is configured to determine an operator distance between the operator fob 20 and the helm transceiver 18. In such embodiments, the wireless lanyard system 10 may be configured to provide a warning period if a return signal is detected, but the operator distance is outside of a permitted zone or less than a predefined signal strength. Such a warning may be the same warning sound or visual alert as described above for a man overboard alert, a different sound or visual alert may be generated when a fob signal strength or other distance-related measurement indicates that the fob slowly moves away from the transceiver 18 rather than a quick disappearance. In such systems, the lanyard control module 49 may be configured to bypass the predefined warning period and immediately generate a lanyard if suddenly no return signal from the wireless operator fob is detected, indicating that the operator may have fallen overboard. In still other embodiments, the control module may be configured to generate a warning for certain types of overboard events (such as passenger overboard events), but not others (such as operator overboard events).

In certain embodiments, the helm transceiver 18 and wireless operator fob 20 may be configured to determine a distance therebetween, which is referred to herein as the operator distance. In one embodiment, the wireless operator fob 20 determines the distance to the helm transceiver 18 based on the helm transceiver signal. In one such embodiment, the helm transceiver 18 determines the operator distance based on the time it receives the responsive signal from the operator fob 20 compared to the time it transmitted its inquiry signal to the operator fob 20. In other embodiments, the operator fob 20 may be configured to determine the operator distance—which may be a "time-of-flight" determination or may be determined based on a measured signal strength of the received inquiry signal—and transmit that operator distance value to the helm transceiver 18.

In still other embodiments, the helm transceiver 18 determines whether the fob 20, 22 is present on the vessel based on whether the fob 20, 22 provides a return signal. In such an embodiment, the helm transceiver 18 may transmit a signal of a predefined strength, thus having a predefined range that covers the marine vessel or a predefined portion thereof. Similarly, the wireless fob 20, 22 may also be configured to provide a return signal at the signal strength equivalent to the radius determined based on an expected distance from the helm (e.g., based on vessel size). Thus, as shown in the example of FIG. 2B, where the operator 12 is overboard, the operator fob 20 does not receive the initial signal from the helm transceiver 18, and thus does not provide a return signal. Likewise, given that water is not an effective transmission medium, any signal emitted by a fob on a person who is in the water is unlikely to reach the helm transceiver 18. In that situation where no return signal is detected by the helm transceiver, an alert may be generated for the predefined warning period, after which a man overboard event may be generated and the propulsion device 11 controlled accordingly. Again, in some embodiments the warning may be omitted and the man overboard event may be generated immediately after the return signal stops.

In the example shown, the lanyard system 10 includes the controller 45. The controller 45 stores and executes the lanyard control module 49, including executing logic to determine whether one or more fobs 20, 22 are detected and generating a man overboard event, and may also provide control instructions to certain devices on the marine vessel to activate one or more search assistance functions. The controller 45 is programmable and includes a processor 46 and a storage system 48 comprising memory. In the depicted embodiment, the lanyard control module 49 is stored on the storage system 48 and executable on the processor 46 of the controller 45. Accordingly, the helm transceiver 18 communicates with the controller 45 to effectuate the wireless lanyard system 10. For example, the controller 45 may communicate with one or more control modules for the respective propulsion devices 11 incorporated within the system 1. In the depicted embodiment, the controller 45 communicates with an engine control module (ECM) 51 for each propulsion device 11. Thereby, the controller 45 can instruct each ECM 51 to effectuate certain control actions, for example, changing the engine speed and/or gear state of each propulsion device 11 in response to a lanyard event and/or to receive such information in order to initiate operation of onboard monitoring by the lanyard system 10.

Only one propulsion device 11 is shown in FIGS. 1A and 1B; however, it will be known to a person having ordinary skill in the art that any number of one or more propulsion devices may be incorporated within the system 1. In various embodiments, the propulsion devices 11 may be an outboard motor, an inboard motor, a sterndrive, or any other propulsion device available for propelling a marine vessel 14. Similarly, the propulsion device 11 may incorporate an internal combustion engine or may be an electric powered propulsion device, such as an electric motor.

The controller can be located anywhere on the marine vessel 14, and/or located remotely from the marine vessel 14. The controller 45 communicates with various components of the system 1 via the vessel network 50 comprising wired or wireless links, as exemplified herein. A person having ordinary skill in the art viewing this disclosure will understand that the lanyard control module 49, and the methods disclosed and discussed herein, can be carried out by various control elements within the system 1, and may be carried out by a single control module or by several separate control modules that are communicatively connected.

The controller 45 may be a computing system that includes a processing system, storage system, software, and input/output (I/O) interfaces for communicating with devices such as those shown in FIGS. 1A and 1B. The processing system loads and executes software from the storage system 48, such as the lanyard control module 49 software. When executed by the controller 45, lanyard control module 49 directs the processing system 46 to operate as described below in further detail to execute the lanyard control method. The computing system may include one or more application modules and one or more processors, which may be communicatively connected. The processing system can comprise a microprocessor (e.g., processor 46) and other circuitry that retrieves and executes software from the storage system. The processing system can be implemented within a single processing device but can also be distributed across multiple processing devices or sub-systems that cooperate in existing program instructions. Non-limiting examples of the processing system include general-purpose central processing units, applications specific processors, and logic devices.

The storage system 48 can comprise any memory, or storage media, readable by the processing system and capable of storing software. The storage system can include volatile and non-volatile, removable and non-removable media implemented in any method or technology for storage of information, such as computer-readable instructions, data structures, program modules, or other data. The storage system can be implemented as a single storage device or across multiple storage devices or sub-systems. The storage system can further include additional elements, such as a controller capable of communicating with the processing system 46. Non-limiting examples of storage media include random access memory, read-only memory, magnetic discs, optical discs, flash memory, virtual memory, and non-virtual memory, magnetic sets, magnetic tape, magnetic disc storage or other magnetic storage devices, or any other medium which can be used to store the desired information and that may be accessed by an instruction execution system. The storage media can be a non-transitory or a transitory storage media.

In this example, the controller 45 communicates with one or more components of the system 1 via a vessel network 50, which can be a wired or wireless link. The controller 45 is capable of monitoring and controlling one or more operational characteristics of the system 1 and its various subsystems by sending and receiving control signals via the vessel network 50. In one example, the vessel network 50 is a controller area network (CAN) bus, such as a CAN Kingdom network, but other types of communication links could be used. It should be noted that the extent of the connections of the vessel network 50 shown herein is for schematic purposes only, and the vessel network 50 may provide communication between the controller 45 and each of the sensors, devices, etc., or control devices therefor, although not every connection is shown in the drawing for purposes of clarity.

As mentioned, the central control module may receive, either directly or indirectly, inputs from several different sensors and/or input devices aboard or coupled to the marine vessel 14. For example, the controller 45 may receive a steering input from a joystick 52 and/or a steering wheel 54. The controller 45 may receive an input from one or more vessel speed sensors 56. The vessel speed sensor 56 may be, for example, a pitot tube sensor 56a, a paddlewheel type sensor 56b, or any other speed sensor appropriate for sensing the actual speed of the marine vessel. Alternatively or additionally, the vessel speed may be obtained by taking readings from a GPS device 59, which calculates speed by determining how far the marine vessel 14 has traveled in a given amount of time. Similarly, the controller 45 may receive input from a position determination device, such as GPS 59, continuously tracking and providing global position information describing the current location of the marine vessel. The propulsion device 11 is provided with an engine speed sensor 58, such as but not limited to a tachometer, which determines a speed of the engine 60 in rotations per minute (RPM). The engine speed can be used along with other measured or known values to approximate a vessel speed (i.e., to calculate a pseudo vessel speed). The system 1 may further include and vessel attitude sensor 57 sensing the orientation of the vessel with respect to an inertial frame of reference. For example, the vessel attitude sensor 57 may be an inertial measurement unit (IMU) comprising a gyroscope, such as a three-axis gyroscope, to detect vessel orientation information. Alternatively or additionally, the attitude sensor 57 may include a magnetometer or may include any other type of position or inertial measurement unit, such as a combination accelerometer and/or gyroscope with a magnetometer.

A gear system 64 and gear state sensor 66 can also be provided for the propulsion device 11. For example, the gear state sensor 66 may provide an output indicating whether the gear system 64 (which may take any of various forms known in the art, such as a dog clutch) is in a forward gear state, a neutral position, or a reverse gear state. In certain embodiments, the outputs of the gear state sensor 66 and/or the engine speed sensor 58 may be provided directly to the controller 45. In other embodiments, the gear state and engine speed information may be provided to an intermediary control device, such as an engine control module, which may then make such information available to the controller 45.

Other inputs to the system 1 can come from operator input devices such as a throttle/shift lever 68, a steering wheel 54, a keypad (not shown), and a touchscreen 72. The throttle/shift lever 68 allows the operator of the marine vessel to choose to operate the vessel in neutral, forward, or reverse, as is known, and the gear system 64 is positioned accordingly. The keypad can be used to initiate or exit any number of control or operation modes (such as to activate and deactivate the lanyard system 10) or to make selections while operating within one of the selected modes.

Figure 3:
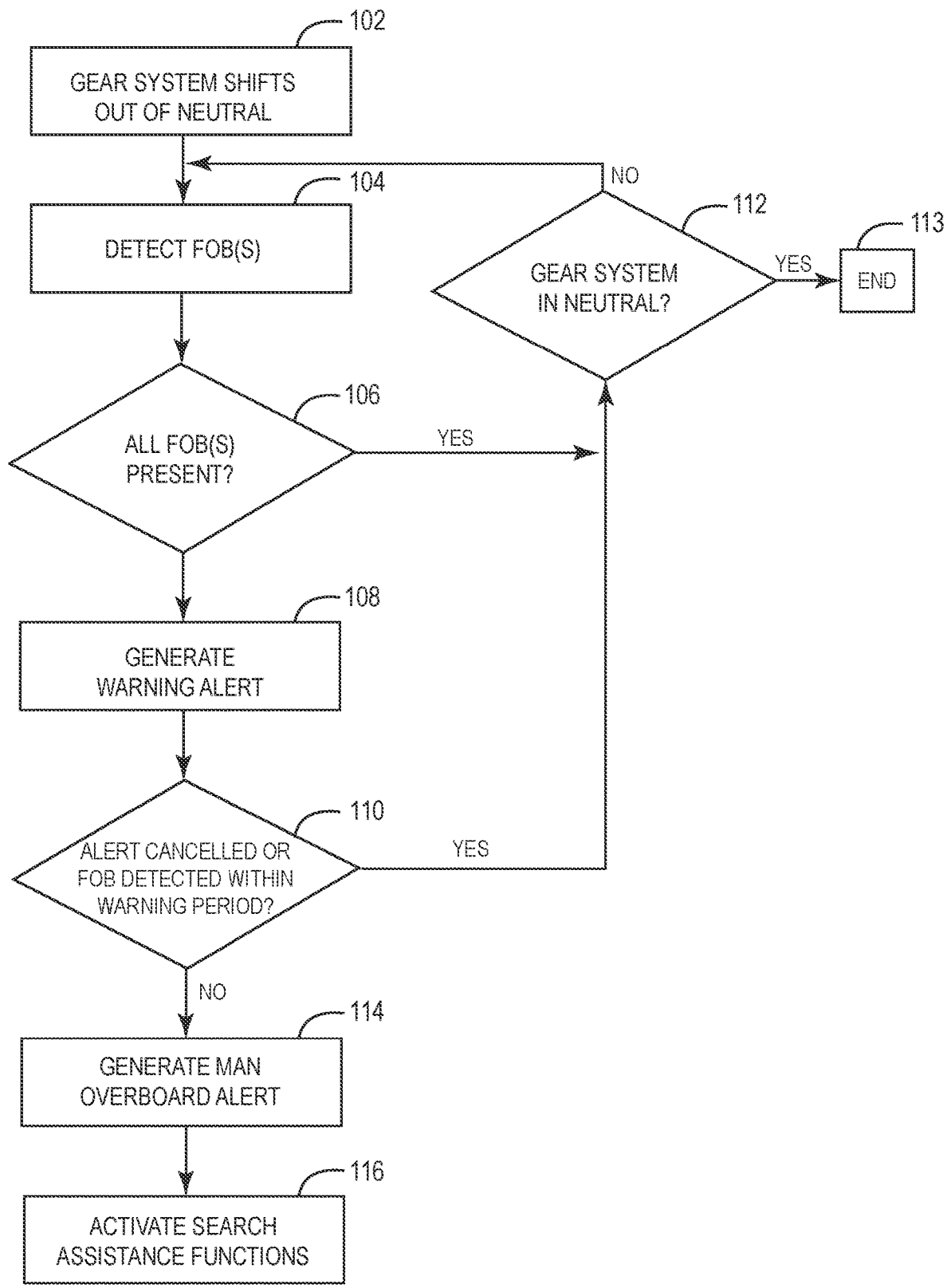
FIGS. 3-4 are flowcharts depicting exemplary methods of detecting and generating a man overboard event and activating one or more search assistance functions in response thereto.
Figure 4:
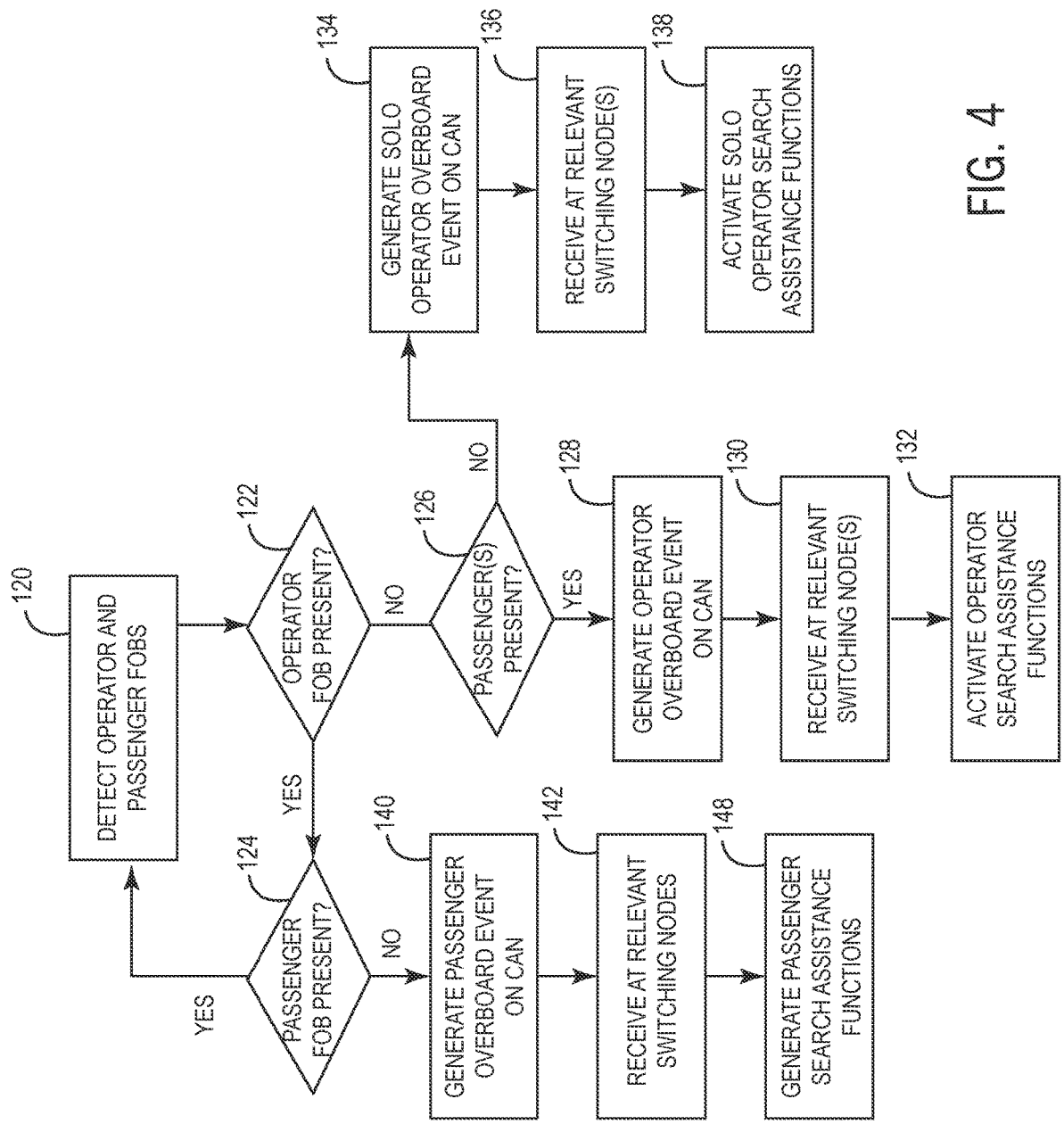

FIGS. 3 and 4 depict exemplary embodiments of methods and functionality performed by a wireless lanyard system 10 alone or in cooperation with a vessel control system 1. In the example in FIG. 3, the wireless lanyard system is initiated when a gear system shifts out of neutral at step 102. The helm transceiver 18 and one or more fobs 20, 22 are operated and communicate so as to detect all present fobs at step 104. The presence of the fobs is monitored as described above. If all fobs remain present at step 106 during each communication check, then all operators and passengers are deemed present. If the gear system remains in gear (e.g., forward or reverse) at step 112, then the detection process continues. If the gear system shifts back into neutral, then the detection process is suspended at step 113.

If any fob is not detected at step 106, then a warning alert is generated at step 108, such as a visual and/or audio alert on the marine vessel. If the alert is not canceled or the missing fob is not detected within a predetermined warning at step 110, then a man overboard alert is generated at step 114. The man overboard alert is generated via the vessel network, such as on a CAN bus or via wireless means. The search assistance functions are then activated at step 116, such as to turn on at least one searchlight, turn on at least one underwater light, control one or more lights to generate an SOS alert, drop an anchor, control a stereo, record a GPS location or other vessel condition information, generate a call for help, etc. If, on the other hand, the alert is canceled or the missing fob is detected within the warning period at step 110, then no man overboard alert is generated and the system continues the fob detection process until the gear system shifts into neutral at step 112. In one embodiment, an alert may be canceled by providing user input at one or more devices in the helm, such as at the touchscreen 72 or at a keypad associated with the lanyard system 10.

FIG. 4 depicts another exemplary embodiment of the enhanced man overboard functionality by the wireless lanyard system 10 according to one embodiment of the present disclosure. An operator fob 20 and at least one passenger fob 22 is detected at step 120, such as upon initiation of the detection functionality based on gear system position or other vessel condition. The presence of the operator fob 20 and the passenger fob(s) 22 is checked. If the operator fob 20 is not detected, then an operator overboard event may be generated, whereas if a passenger fob is not detected, a passenger overboard event may be generated. Other types of overboard events may also be differentiated. In the depicted example, the wireless lanyard system is configured to generate two different types of operator overboard events depending on whether passengers are present on the marine vessel or not.

If no operator fob is detected at step 122, then the system may conduct further assessment to determine whether the operator was the only person on the marine vessel, or if passengers are aboard that may be available to control the vessel and/or provide rescue assistance. If one or more passengers are present on the marine vessel at step 126, such as one or more passenger fobs 22 being detected, then an operator overboard event may be generated at step 128. In certain embodiments, the warning period may be implemented, as described above in FIG. 3. In the depicted example, the operator overboard event is generated on the CAN bus by generating a CAN message that will be interpreted by receiving nodes as an operator overboard event. The operator overboard event CAN message is received at relevant digital switching nodes at step 130. Those digital switching nodes configured to listen for operator overboard event messages will control one or more devices on the system 1 to generate operator assist functions, multiple examples of which are described herein.

If no passenger fob is detected at step 126, then a solo operator overboard event is generated at step 134, which in the depicted example is a solo operator overboard event message communicated on the CAN network. In certain embodiments, a warning period may be implemented in the event of a solo operator overboard event. For example, the warning period may be different than that for other types of events, such as shorter or generated in a way that is more localized to the helm. In other embodiments, no warning alert may be generated for a solo operator overboard event given that a solo operator falling overboard is very serious and hazardous. The solo operator overboard event is received by relevant switching nodes at step 136, which are those digital switching nodes configured to listen for solo operator overboard events and to control one or more devices accordingly to generate the solo operator assistance functions at step 138.

Returning to step 124, if a passenger fob is not detected, then a passenger overboard event is generated at step 140, which in this example is via the CAN network. Again, in certain embodiments, a waiting period may be implemented in which the event can be canceled or the missing passenger fob 22 detected in order to cancel the passenger overboard event. In the depicted embodiment, certain digital switching nodes are configured to listen for passenger overboard events and respond accordingly. When the passenger overboard event is received at the relevant digital switching nodes at step 142, the passenger search assistance functions are generated at step 148.

This written description uses examples to disclose the invention, including the best mode, and also to enable any person skilled in the art to make and use the invention. Certain terms have been used for brevity, clarity and understanding. No unnecessary limitations are to be inferred therefrom beyond the requirement of the prior art because such terms are used for descriptive purposes only and are intended to be broadly construed. The patentable scope of the invention is defined by the claims, and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

What is claimed is:

1. A vessel control system for a marine vessel propelled by at least one propulsion device, the system comprising:
   a wireless lanyard system including:
      at least one fob worn by an individual on the marine vessel, wherein each of the at least one fob is either an operator fob or a passenger fob;
      a helm transceiver at a helm area of the marine vessel configured to receive radio signals from the at least one fob;
   a controller configured to:
      detect, based on communications between each of the at least one fob and the helm transceiver, that each of the at least one fob is present on the marine vessel;
      determine that a missing fob of the at least one fob is no longer detected at the helm transceiver, wherein the missing fob is either the operator fob or the passenger fob;
      generate a man overboard event when the missing fob is not detected, wherein the man overboard event is an operator overboard event if the missing fob is the operator fob or a passenger overboard event if the missing fob is the passenger fob; and
   wherein the vessel control system is configured to automatically activate one or more search assistance functions based on the man overboard event, wherein the search assistance functions activated depend on whether the man overboard event is the operator overboard event or the passenger overboard event.

2. The system of claim 1, further comprising a vessel network on the marine vessel that communicatively links the controller and at least one digital switching node connected to at least one search assistance device;
   wherein the controller is configured to generate the man overboard event by communicating one of an operator overboard message or a passenger overboard message on the vessel network; and
   wherein, upon receipt of the man overboard event, the digital switching node activates at least one of the search assistance devices to perform at least one of the search assistance functions based on whether the operator overboard message or the passenger overboard message is received.

3. The system of claim 2, wherein the at least one search assistance device includes at least one of a searchlight, an underwater light, an anchor, and a stereo, and wherein the automatically-activated search assistance functions include at least one of turning on the at least one of the searchlight, the underwater light, dropping the anchor, reducing the stereo volume, and turning off the stereo.

4. The system of claim 2, further comprising an engine controller associated with the at least one propulsion device and configured to receive the man overboard event via the vessel network and then, only if the man overboard event is the operator overboard event, to automatically control the propulsion device to stop propelling the marine vessel.

5. The system of claim 1, wherein the automatically-activated search assistance functions activated when the man overboard event is the operator overboard event is different than the automatically-activated search assistance functions activated when the man overboard event is the passenger overboard event.

6. The system of claim 1, wherein the automatically-activated search assistance functions include at least one of turning on a searchlight, turning on an underwater light, controlling one or more lights to generate an SOS alert, dropping an anchor, reducing a volume of a stereo, and turning off the stereo.

7. The system of claim 1, wherein the automatically-activated search assistance functions include recording at least one of a GPS location and IMU data in a memory of the controller.

8. The system of claim 1, wherein the at least one fob includes the operator fob and at least one of the passenger fob; and
wherein, only if the missing fob is the operator fob and not the passenger fob, the search assistance functions include automatically controlling the propulsion device to stop propelling the marine vessel.

9. The system of claim 8, wherein, if the missing fob is the passenger fob, the search assistance functions include at least one of turning on at least one searchlight, turning on at least one underwater light, reducing a stereo volume, and turning off a stereo;
wherein, if the missing fob is the operator fob, the search assistance functions include at least one of generating an SOS alert and dropping an anchor.

10. The system of claim 8, wherein the controller is further configured to determine whether a remaining fob being either of the passenger fob or the at least one of the operator fob is detected on the marine vessel and to further generate the man overboard event based on whether the remaining fob is detected; and
wherein the one or more search assistance functions activated depend on whether the remaining fob is detected.

11. The system of claim 1, wherein the controller is further configured to generate a solo operator overboard event when the at least one fob includes only one operator fob or when none of the at least one fob is detected on the marine vessel; and
wherein the one or more search assistance functions activated depend on whether the man overboard event is the solo operator overboard event.

12. The system of claim 1, wherein the controller is configured to determine that no fob is detected on the marine vessel and to generate the man overboard event based thereon, and wherein the one or more search assistance functions activated depend on whether the generated man overboard event indicates that no fob is detected.

13. A method of controlling a marine vessel, the method comprising:
operating a lanyard system to detect at least one fob worn by an individual present on the marine vessel, wherein each of the at least one fob is either an operator fob or a passenger fob;
determining that a missing fob of the at least one fob is no longer detected, wherein the missing fob is either the operator fob or the passenger fob;
generating a man overboard event based on the missing fob, wherein the man overboard event is an operator overboard event if the missing fob includes the operator fob or a passenger overboard event if the missing fob is the passenger fob; and
automatically activating one or more search assistance functions based on the man overboard event, wherein the search assistance functions activated depend on whether the man overboard event is the operator overboard event or the passenger overboard event.

14. The method of claim 13, wherein each of the at least one fob is a lanyard connectable to a switch when the individual is present on the marine vessel, and wherein determining that the fob is no longer detected includes determining that the lanyard is no longer connected to the switch.

15. A method of controlling a marine vessel, the method comprising:
operating a wireless lanyard system to receive, at a helm transceiver at a helm area of the marine vessel, radio signals from at least one fob worn by an individual on the marine vessel, wherein each of the at least one fob is either an operator fob or a passenger fob;
detecting, based on communications between each of the at least one fob and the helm transceiver, that each of the at least one fob is present on the marine vessel;
determining that a missing fob of the at least one fob is no longer detected at the helm transceiver, wherein the missing fob is either the operator fob or the passenger fob;
generating a man overboard event when the missing fob is not detected, wherein the man overboard event is an operator overboard event if the missing fob is the operator fob or a passenger overboard event if the missing fob is the passenger fob; and
automatically activating one or more search assistance functions based on the man overboard event, wherein the search assistance functions activated depend on whether the man overboard event is the operator overboard event or the passenger overboard event.

16. The method of claim 15, further comprising detecting that a gear system of a propulsion device is shifted out of a neutral position prior to operating the wireless lanyard system to receive the radio signals from the at least one fob such that no man overboard event is generated when the gear system of the propulsion device is in the neutral position or the propulsion device is off.

17. The method of claim 15, wherein generating the man overboard event includes communicating a man overboard message on a vessel network to at least one digital switching node connected to at least one search assistance device; and
wherein automatically activating the one or more search assistance functions includes operating the at least one digital switching node to activate at least one of the search assistance devices based on whether the man overboard message includes indicates the operator overboard event or the passenger overboard event.

18. The method of claim 15, wherein one or more different search assistance functions are activated when the man overboard event is the operator overboard event than when the man overboard event is the passenger overboard event.

19. The method of claim 18, wherein the search assistance functions generated for the operator overboard event but not for the passenger overboard event include automatically controlling a propulsion device to stop propelling the marine vessel.

20. The method of claim 15, wherein the at least one fob includes the operator fob and at least one passenger fob; and
wherein the search assistance functions activated depend on whether the missing fob includes the operator fob, the passenger fob, or all fobs.

21. The method of claim 20, wherein, if the missing fob is the operator fob, the search assistance functions include at least one of controlling one or more lights to generate an SOS alert, dropping an anchor, and automatically controlling a propulsion device to stop propelling the marine vessel; and
wherein, if the missing fob is the passenger fob, the search assistance functions include at least one of turning on at least one searchlight, turning on at least one underwater light, reducing a stereo volume, and turning off a stereo.

22. The method of claim 20, further comprising determining that no fob is detected on the marine vessel and generating the man overboard event based thereon, and wherein the one or more search assistance functions activated depend on whether the generated man overboard event indicates that no fob is detected.

23. The method of claim 20, further comprising determining whether a remaining fob being either of the passenger fob or the operator fob is detected on the marine vessel and generating the man overboard event based further on whether the remaining fob is detected; and wherein the one or more search assistance functions activated depend on whether the remaining fob is detected.

24. The method of claim 20, further comprising generating a solo operator overboard event when the at least one fob includes only one operator fob or when none of the at least one fob is detected on the marine vessel; and wherein the one or more search assistance functions activated depend on whether the man overboard event is the solo operator overboard event.

* * * * *